July 21, 1959 R. C. HERRMANN 2,896,193

MAGNETIC MEMORY STORAGE APPARATUS

Filed Oct. 21, 1954 5 Sheets-Sheet 1

RICHARD C. HERRMANN
*INVENTOR.*

BY Francis W. Crotty

HIS ATTORNEY

MAGNETIC MEMORY STORAGE APPARATUS

Filed Oct. 21, 1954 5 Sheets-Sheet 2

RICHARD C. HERRMANN
*INVENTOR.*

BY Francis W. Crotty

HIS ATTORNEY

July 21, 1959 R. C. HERRMANN 2,896,193

MAGNETIC MEMORY STORAGE APPARATUS

Filed Oct. 21, 1954 5 Sheets-Sheet 3

INVENTOR:
RICHARD C. HERRMANN
BY Francis W. Crotty
HIS ATTORNEY.

INVENTOR:
RICHARD C. HERRMANN
BY Francis W. Crotty
HIS ATTORNEY.

July 21, 1959 R. C. HERRMANN 2,896,193

MAGNETIC MEMORY STORAGE APPARATUS

Filed Oct. 21, 1954 5 Sheets-Sheet 5

RICHARD C. HERRMANN
*INVENTOR.*

BY Francis W. Crotty

HIS ATTORNEY.

2,896,193

MAGNETIC MEMORY STORAGE APPARATUS

Richard C. Herrmann, Chicago, Ill., assignor to Zenith Radio Corporation, a corporation of Delaware Application October 21, 1954, Serial No. 463,700

3 Claims. (Cl. 340—174)

This invention pertains to storage apparatus and more particularly to a novel apparatus for storing pulse information through the use of a magnetic memory device. The storage apparatus of the present invention is particularly useful when incorporated into the encoding signal generator portion of a subscription television system and for that reason is described in such an environment.

Storage devices of the magnetic type have been used in the past to realize pulse information storage without requiring relatively complex vacuum tube circuits. Perhaps the simplest of these devices comprises a transformer having an input and output winding and a ferromagnetic core which exhibits a substantially rectangularly shaped hysteresis loop or B—H curve (with B or flux density being plotted along the ordinate and H or magnetizing along the abscissa). Because of the substantially flat top and bottom portions of the loop or curve, once the core is saturated in a given direction in response to the application of a pulse to its input winding, further pulses which tend to saturate the core in the same direction effect no further change in the flux density condition; therefore, no pulses are produced in the output winding. However, the first pulse of an opposite polarity which subsequently occurs causes an extremely large change in flux density, thereby producing a pulse in the output winding. The presence or absence of an output pulse is thus determined by the previous history of the core, namely whether or not a pulse has been stored. Inasmuch as there are two substantially flat portions on the B—H curve, the core may be said to have two stable operating states.

Another static magnetic memory device that has found wide use includes three, rather than two, windings encompassing the core, two input windings and one output winding. The core is initially magnetized to saturation in one direction so that the flux density condition is established at, for example, the zero H (magnetizing force) point or —B intercept on the bottom portion of the hysteresis loop. Periodically recurring timing pulses are applied to one of the input windings with a polarity tending to alter the flux density to saturation in the other direction, but the magnitude of these pulses is so adjusted that each pulse alone is insufficient to change the flux density condition to saturation in the other direction; consequently, the flux density of the core remains at the bottom portion of the hysteresis loop and at the —B intercept. At the same time, randomly occurring pulses (which are to be stored) are applied to the other input winding of the transformer, also with a polarity tending to alter the flux density to saturation at the top portion of the B—H curve, but as in the case of the timing pulses, the magnitude of the pulses to be stored is such that each pulse alone is not capable of altering the flux density from the zero H point along the bottom of the loop (namely in a +H direction to the right) and then straight up to maximum B on the top portion of the hysteresis loop.

However, when a randomly occurring storing pulse and a periodically recurring timing pulse occur simultaneously their combined effect is to establish the core at the maximum flux density on the top portion of the B—H curve. Thus, the core is now conditioned to its opposite stable operating state from that initially established and will remain in that condition until subsequently utilized or read out.

This arrangement is quite effective and does permit adequate storage of pulse information. However, it suffers from one disadvantage in that the cores employed must necessarily exhibit relatively critical rectangularly shaped hysteresis loops or B—H curves in order to function properly. To elucidate, if the bottom portion of the curve is not flat (namely, if it exhibits a slight rise going from left to right), each time a timing pulse occurs and is not accompanied by a randomly occurring storing pulse, the flux density condition travels along the hysteresis loop from the —B intercept to the right and up the slight rise and then, upon termination of the applied timing pulse, the flux density returns on a horizontal line back to the ordinate axis. However, since the flux density varies somewhat due to the slight rise in the bottom portion of the B—H curve, it will not return to the very same point from which it started; the final flux density condition will be slightly less than it was initially. If additional periodically recurring timing pulses are applied, without being accompanied by randomly occurring storing pulses, the flux density condition varies in the same manner and travels over or describes different B—H curves. All this time the residual magnetization is being decreased.

In the computer art the H-zero point or —B intercept on the bottom portion of the hysteresis loop is called point zero and the H-zero point or +B intercept on the top portion is so called point one. Traversing different B—H curves with a gradual lessening of the residual magnetism is called a "disturbed zero" condition and results in very undesirable operation.

As mentioned before, a core exhibiting a perfect or nearly perfect rectangular hysteresis loop does not result in this undesirable condition. However, cores of this type are generally expensive and do not lend themselves readily to mass production. In accordance with the present invention, effective storage of pulse information is achieved with static magnetic memory devices and yet the hysteresis loops of the cores employed need not be rectangular to such a critical degree. Consequently, considerably less expensive cores may be used.

Storage is achieved in the present invention by applying two series of pulses to the magnetic memory devices, only one of which is stored while the other is used for timing purposes. The timing pulses all have a polarity and magnitude sufficient to alter the flux density from one point, for example, saturation at the bottom portion of the B—H curve, to a second point, such as saturation at the top portion of the hysteresis loop. The pulses to be stored, on the other hand, occur in time coincidence with the timing pulses and have a polarity and magnitude sufficient to balance out the effect of the timing pulses and restrain the flux density condition from changing to the second point on the hysteresis loop. Whether or not the core is established at the second point on the B—H curve upon termination of each timing pulse determines whether or not information has been stored.

With this arrangement, although some of the timing pulses do not occur in time coincidence with pulses to be stored, the flux density still travels or traverses the same B—H curve (even if the core does not have a perfectly rectangular hysteresis loop) since the flux varies in response to a timing pulse alone from one point to a second point on the hysteresis loop, and if that second point is saturation in the other direction subsequent timing pulses of the same polarity are ineffective and cannot possibly result in the describing of different B—H curves with progressively decreasing residual magnetization.

It is, accordingly, an object of the present invention to provide an improved storage apparatus which is relatively inexpensive and lends itself to mass production techniques.

Another object of the present invention is to provide a storage apparatus which employs static magnetic memory devices similar to arrangements in the past but yet is not plagued by the disadvantages of those previous arrangements.

A storage apparatus constructed in accordance with the present invention comprises a first transformer including a first ferromagnetic core and a plurality of windings encompassing the first core, which core exhibits a predetermined first substantially rectangularly shaped hysteresis loop. There are first presetting means including a source of reset pulses for magnetizing the first core at spaced time intervals to establish an initial flux density condition at a predetermined point on the first hysteresis loop. A source of timing signal pulses, individually occurring subsequently to one of the spaced time intervals, is coupled to a winding of the first transformer for applying pulses thereto with a polarity tending to alter the flux density condition of the first core from the predetermined point to a second point on the first hysteresis loop. There is a source of read-out signal pulses individually occurring subsequently to respective ones of the timing pulses. A source of storing signal pulses, some of which individually occur in time coincidence with individual ones of the timing pulses while others individually occur between individual ones of the timing pulses and the immediately succeeding individual read-out pulses, is coupled to a winding of the first transformer for applying pulses thereto with a polarity tending to restrain the flux density condition from changing to the second point on the first hysteresis loop. The storage apparatus also comprises a second transformer including a second ferromagnetic core and a plurality of windings encompassing the second core, the second core exhibiting a predetermined second substantially rectangularly shaped hysteresis loop. There are second presetting means including the source of reset pulses for magnetizing the second core at the spaced time intervals to an initial flux density condition at a predetermined point on the second hysteresis loop. Means including an additional winding of the first transformer and further including unidirectional coupling means are provided for supplying signal pulses of only one polarity to a winding of the second transformer with such one polarity tending to alter the flux density condition of the second core from the predetermined point to a second point on the second hysteresis loop in response to the application to the first transformer of the timing pulses that do not occur in time coincidence with any of the storing pulses. There are means for applying the read-out pulses to a winding of the second transformer. Finally, the storage apparatus comprises means including a winding of the second transformer for sending the particular flux density condition of the first core subsequent to each of the timing pulses.

The features of this invention which are believed to be new are set forth with particularity in the appended claims. The invention, together with further objects and advantages thereof, may best be understood, however, by reference to the following description when taken in conjunction with the accompanying drawings, in which:

Figure 1:
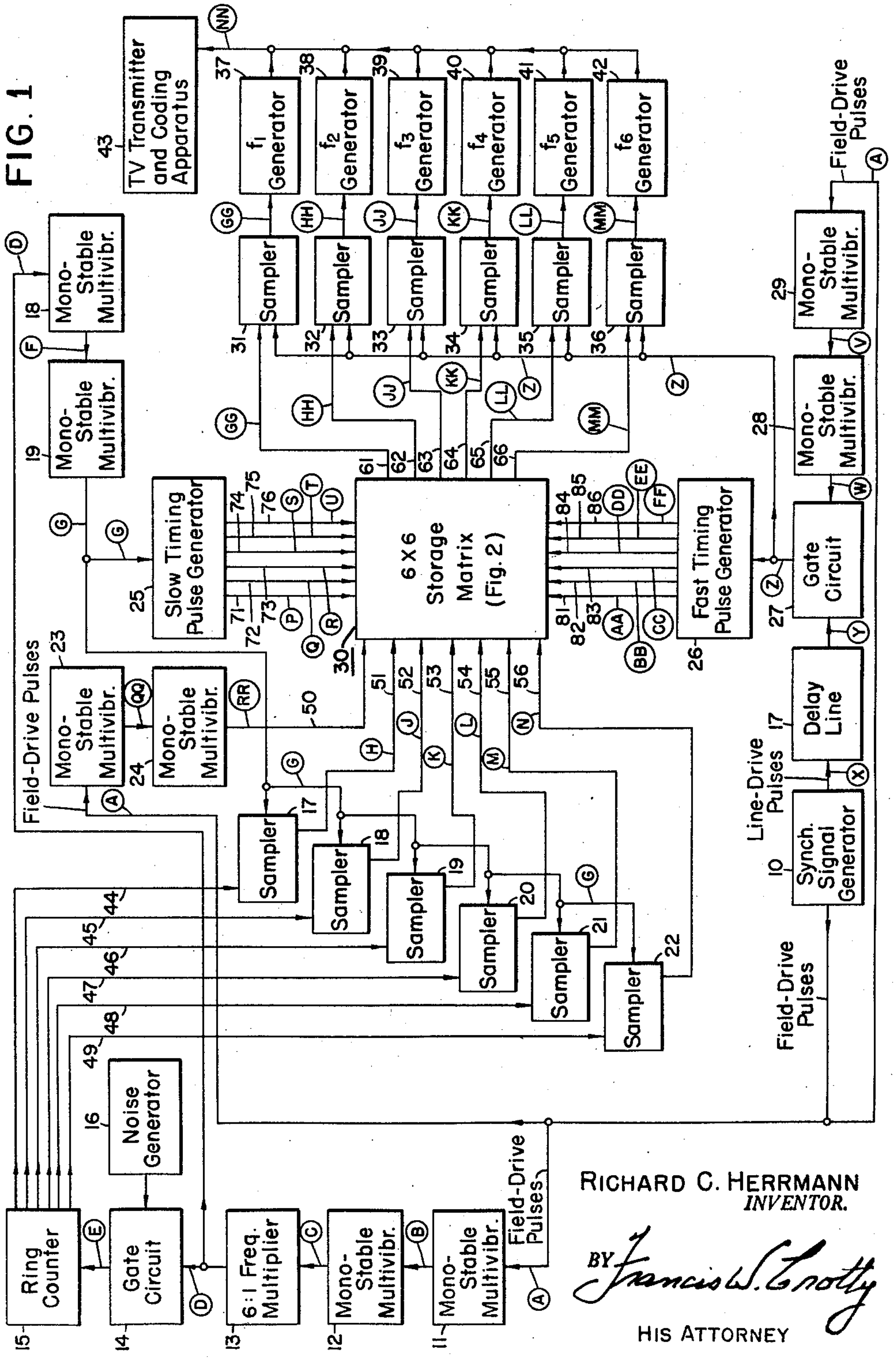
Figure 1 is a schematic representation of an encoding signal generator which includes a storage matrix embodying the invention.

The encoding-signal generator of Figure 1 includes a conventional television synchronizing-signal generator 10 which has an output circuit connected to a mono-stable multivibrator 11 to supply field-drive pulses thereto. Multivibrator 11 is connected to another mono-stable multivibrator 12 having output terminals connected to the input circuit of a 6:1 frequency multiplier 13. A normally-closed gate circuit 14 has one input circuit connected to the output circuit of multiplier 13, another input circuit connected to a noise generator 16 which constitutes a source of random acuating signal and an output circuit connected to a multi-stable counting mechanism or ring counter 15. This counting mechanism or ring counter, which has a multiplicity of stable operating conditions, may be of conventional construction and operates in response to an applied pulse type actuating signal for sequential actuation between its stable operating conditions. A typical ring counter which may be incorporated into the generator of Figure 1 is shown and described in detail on page 24 of "High-Speed Computing Devices" by the staff of Engineering Research Associates, Inc. and published by McGraw-Hill Book Company, Inc. in 1950. The ring counter disclosed in that publication has a multiplicity of intercoupled electron-discharge paths and operates in response to an applied actuating signal for rendering these paths conductive one at a time in a predetermined sequence.

As is well understood in the art, a multi-stable counting mechanism such as a ring counter advances from one stable operating condition to the next usually in a predetermined sequence and at any given instant it may be established in any one of its multiplicity of operating conditions as determined by the applied signal. For illustrative purposes in discussing the embodiment of Figure 1, it will be assumed that ring counter 15 comprises seven operating stages with seven stable operating conditions and is provided with six output circuits 44—49 for developing respective output signals in response to establishment of counter 15 in six of its stable operating conditions. For reasons to be discussed hereinafter, it is desirable to employ only six output circuits so that no output signal is developed when counter 15 is established in the remaining stable operating condition.

Output circuits 44—49 are connected to respective input circuits of a plurality of samplers 17—22. Frequency multiplier 13 is also connected to a pair of series-connected mono-stable multivibrators 18 and 19, and multivibrator 19 is parallel-coupled to additional input circuits of samplers 17—22. The output circuits of samplers 17—22, are connected to one series of input circuits, 51—56 respectively, of a 6 x 6 storage matrix 30. This storage matrix, which embodies elements constructed in accordance with the present invention and is illustrated and described in detail in connection with Figure 2, has another series of input circuits 71—76 individually connected to an output circuit of a slow-timing pulse generator 25. This generator has its input circuit connected in turn to the output circuit of multivibrator 19 and may be constructed in a manner very similar to that of ring counter 15 in that it may have a multiplicity of stable operating conditions and be advanced from one condition to the next in response to each applied pulse.

A mono-stable multivibrator 29 is also connected to synchronizing-signal generator 10 to derive field-drive pulses therefrom and the output circuit of this multivibrator is connected to a mono-stable multivibrator 28. A normally-closed gate circuit 27 has one input circuit connected to synchronizing-signal generator 10 through a delay line 17 to derive delayed line-drive pulses, another input circuit connected to the output terminals of mono-stable multivibrator 28, and an output circuit connected to a fast-timing pulse generator 26, which is similar in construction to generator 25. Generator 26 similarly has a series of output circuits connected to a series of input circuits 81—86 of 6 x 6 storage matrix 30.

Storage matrix 30 has a series of output circuits 61—66 connected respectively to input circuits of a series of samplers 31—36, these samplers also having input circuits parallel-connected to the output circuit of normally-closed gate circuit 27. The output circuits of samplers 31—36 are connected respectively to a plurality of signal generators 37—42, each of these generators producing a signal having a predetermined distinctive frequency characteristic $f_1$—$f_6$ respectively. The output circuits of generators 37—42 are connected in common to the input terminals of a unit 43 that includes conventional television transmitter equipment along with suitable coding apparatus, as for example that described in a copending application of Jack E. Bridges, Serial No. 326,107, filed December 15, 1952, now Patent 2,823,252, and assigned to the present assignee.

In order to reset storage matrix 30 to an initial reference condition, a mono-stable multivibrator 23 is connected to synchronizing-signal generator 10 to derive field-drive pulses therefrom, and this multivibrator is connected to the input circuit of a mono-stable multivibrator 24. The output circuit of multivibrator 24 is connected to an additional input circuit 50 of storage matrix 30 for reset purposes.

Figure 2:
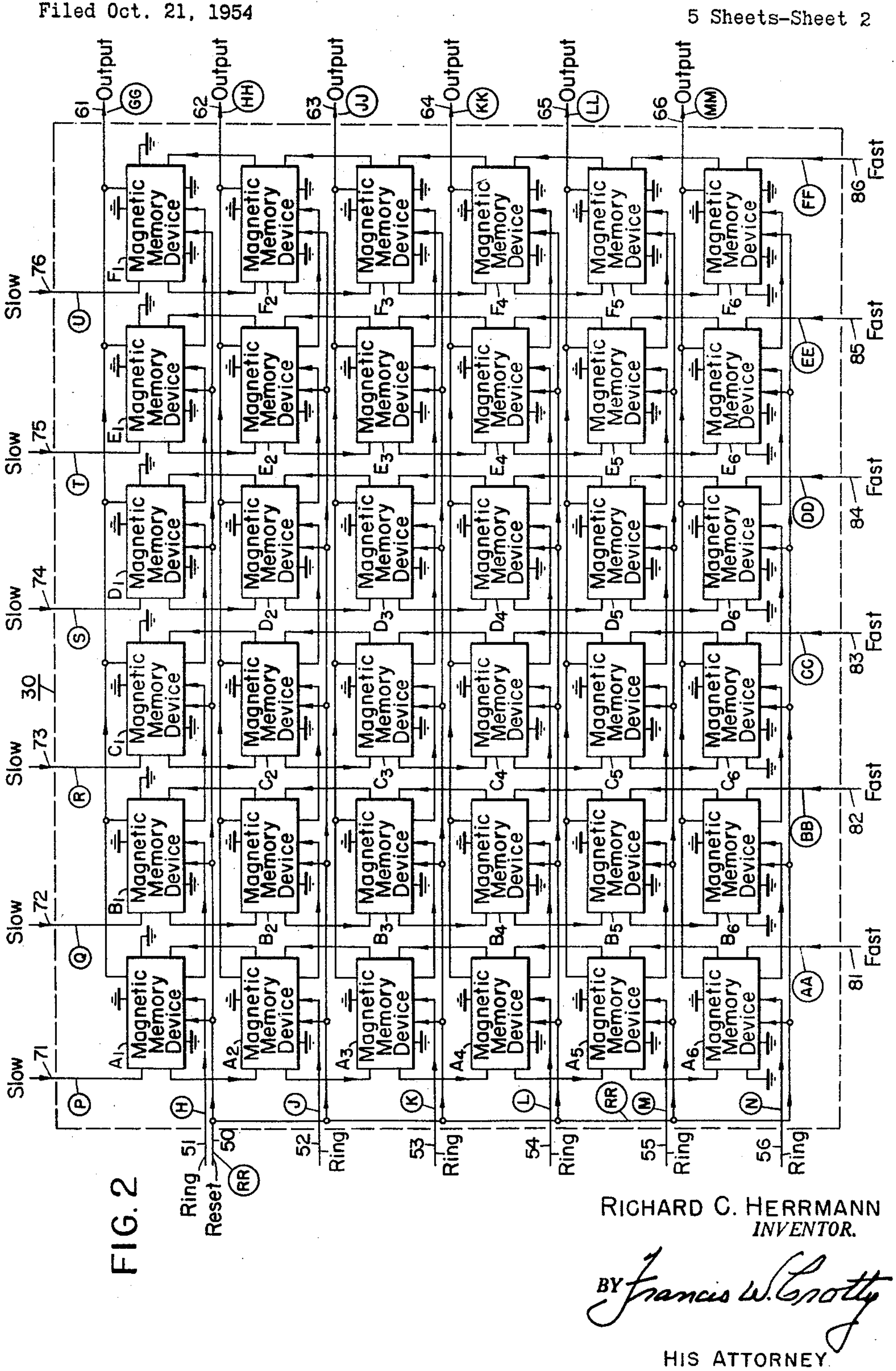
Figure 2 is a detailed schematic representation of the storage matrix of Figure 1.

Storage matrix 30 is shown in more detail in Figure 2 and comprises thirty six magnetic memory devices, designated A1–F6, arranged in six rows 1–6 and six columns A–F. Each memory device is located at a specific cross point in the 6 x 6 matrix and has one ("slow") input circuit coupled to a selected one of input circuits 71—76 from slow timing pulse generator 25, another ("fast") input circuit coupled to a selected one of input circuits 81—86 from fast-timing pulse generator 26, another ("ring") input circuit coupled to a selected one of input circuits 51—56 from samplers 17—22, still another ("reset") input circuit coupled to reset connection 50 from multivibrator 24, and one of a plurality of output circuits 61—66 individually coupled to a selected one of samplers 31—36.

Figure 5:
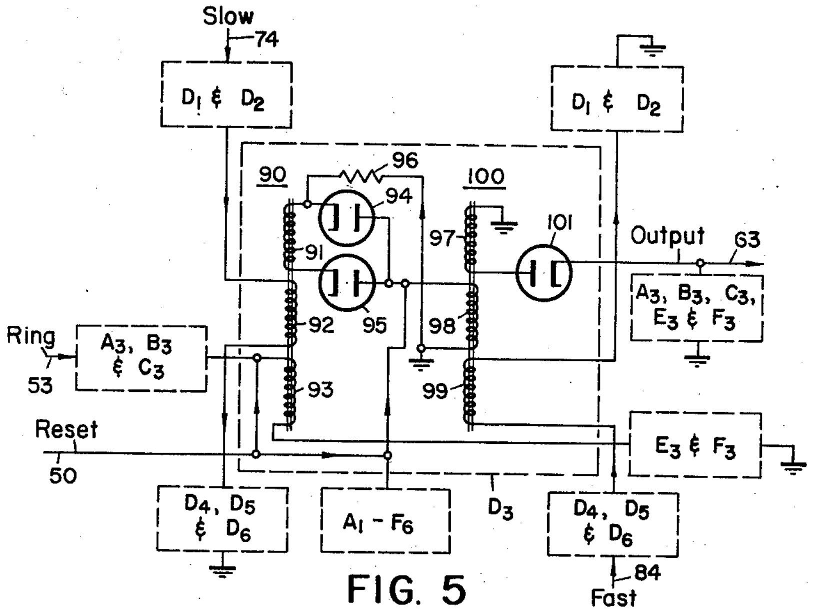
Figure 5 is a detailed schematic representation of a portion of the storage matrix shown in Figure 2 and illustrates a typical storage apparatus constructed in accordance with the present invention; and, Figure 6 is a graphical representation of certain operating characteristics of the circuit shown in Figure 5.

In order to facilitate a full appreciation of the construction of matrix 30 and the manner in which each one of memory devices A1–F6 accomplishes storage of "bits" of information in accordance with the invention, one of the memory devices has been shown in complete detail in Figure 5. Merely for illustrative purposes, memory device D3, which is similar in all respects to the other devices, has been selected. The D3 memory device includes an input transformer 90 and an output transformer 100 each having a ferromagnetic core which exhibits a substantially rectangular hyteresis loop as illustrated at 120 and 130 respectively in Figure 6. Transformer 90 comprises a pair of input windings 92 and 93 and an output winding 91, and transformer 100 similarly comprises input windings 98, 99 and an output winding 97. One terminal of input winding 92 of transformer 90 is connected to input circuit 74 from slow-timing pulse generator 25 through similar windings in memory devices D1 and D2, the other terminal of winding 92 being connected to ground through similar windings in memory devices D4, D5 and D6. One terminal of input winding 93 of transformer 90 is connected through similar windings in memory devices A3, B3 and C3 to input circuit 53 from sampler 19, and also to reset connection 50, and the other terminal of winding 93 is connected to ground through similar windings in memory devices E3 and F3. One terminal of output winding 91 of transformer 90 is connected through a diode 94 to one terminal of input winding 98 of transformer 100, and the other terminal of winding 91 is connected through a diode 95 to the same terminal of winding 98. The other terminal of winding 98 is connected to ground and also through a resistor 96 to the terminal of winding 91 connected to diode 94. Diodes 94, 95 and resistor 96 are employed to insure that current travels in one direction only through the circuit coupling windings 91 and 98. Moreover, diode 94 prevents "reverse" current flow from winding 98 to 91 even though it is in the right direction since diode 94 effectively serves as a short circuit across winding 91. Reset connection 50 is also connected to the ungrounded terminal of winding 98 and to all similar windings 98 and 93 of all the other memory devices A1–F6. One terminal of input winding 99 of transformer 100 is connected through similar windings in memory device D4, D5 and D6 to input circuit 84 from fast-timing signal generators 26, and the other terminal of winding 99 is connected to ground through similar windings in storage devices D1 and D2. One terminal of output winding 97 of transformer 100 is conected to ground and the other terminal is connected through a diode 101 to output circuit 63, which is connected in parallel to all of the similar output windings of memory devices A3, B3, C3, E3 and F3 in the same row.

Figure 3:
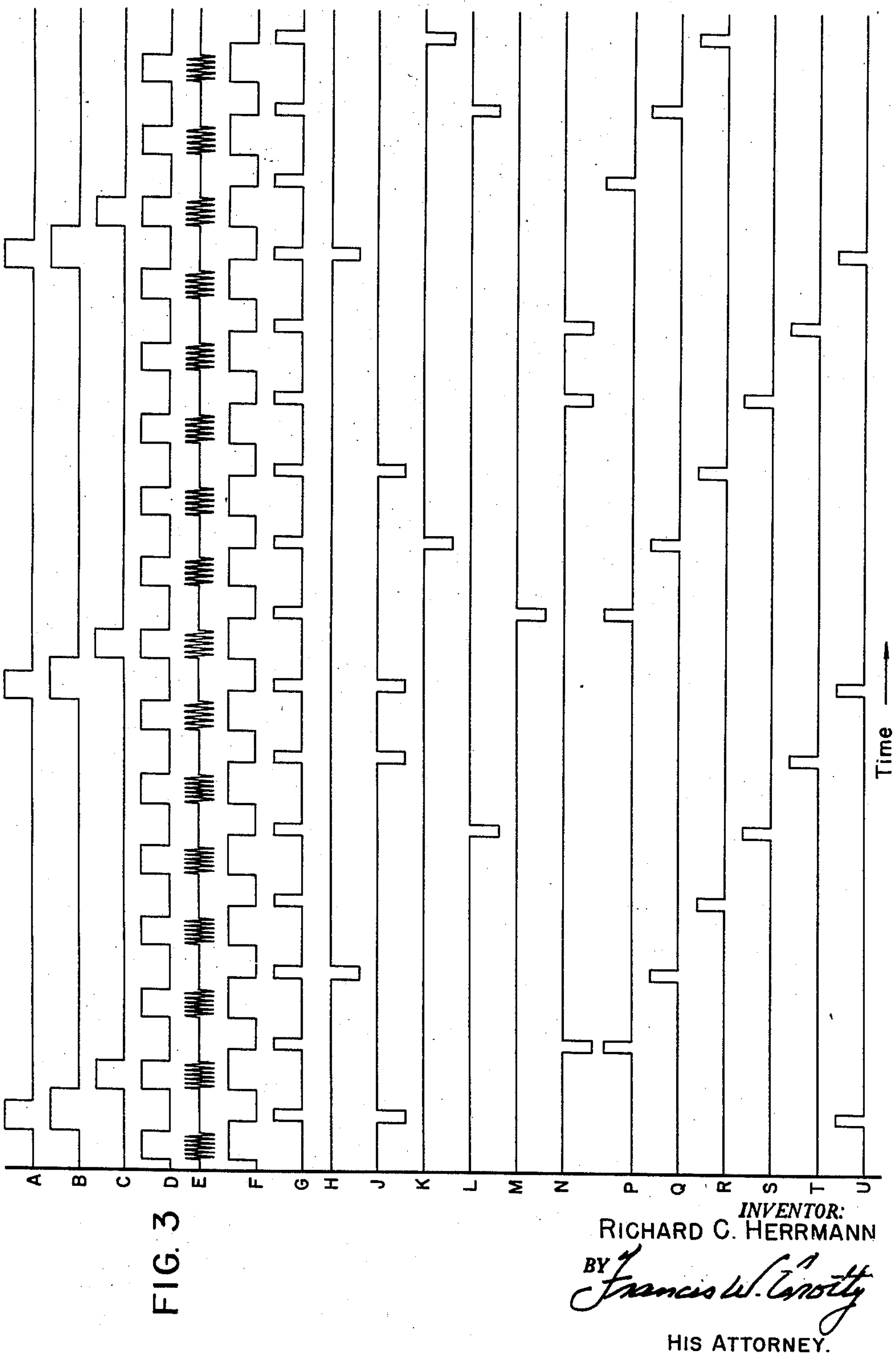
Figures 3 and 4 are graphical representations of certain waveforms which are useful in explaining the operation of the generator.
Figure 4:
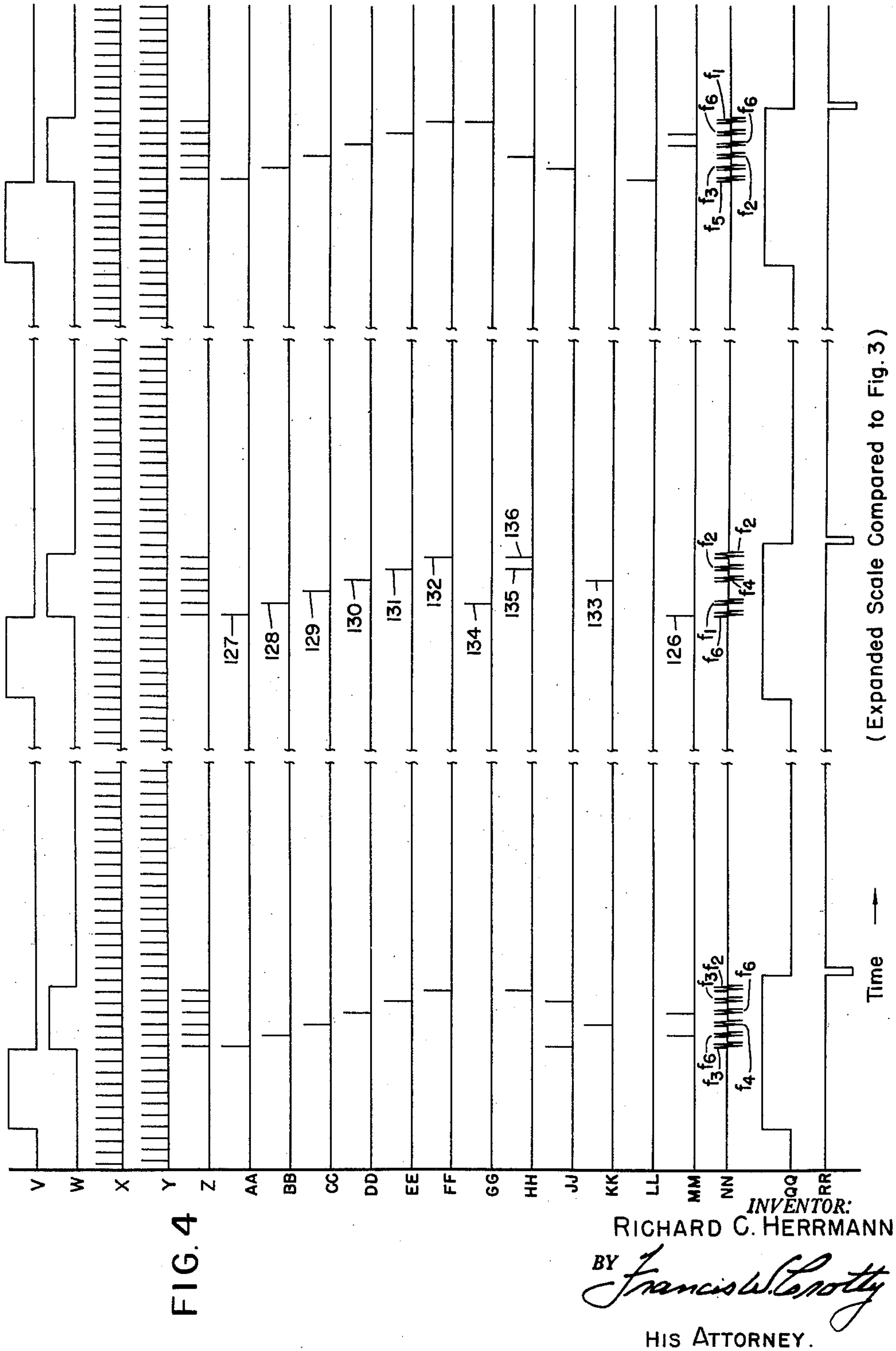

In order to simplify the detailed explanation of the operation of the generator, idealized signal waveforms appearing at various portions thereof, indicated by encircled reference letters and shown on a non-linear time scale abscissa, are given corresponding letter designations in the graphical representations of Figures 3 and 4. In the operation of the generator of Figure 1, periodically recurring field-drive pulses (curve A) are supplied to mono-stable multivibrator 11 which is actuated from its normal operating condition to its abnormal operating condition in response to the leading edge of each applied pulse. The circuit parameters of multivibrator 11 are so chosen that it automatically returns to its normal operating condition at a time subsequent to the termination of the actuating field-drive pulses but prior to the leading edge of the ensuing field-drive pulse to develop the elongated pulses illustrated in curve B. These latter pulses are applied to mono-stable multivibrator 12 which is actuated in response to the trailing edges thereof from its normal operating condition to its abnormal condition, automatically returning to its normal operating condition at the end of a predetermined time interval to develop the series of pulses shown in curve C. As illustrated, the pulses of curve C have approximately the same duration as the field-drive pulses of curve A; however, it will be appreciated that such a relationship has been shown only for convenience and actually the pulses of curve C may be longer or shorter than those of curve A. These pulses are then applied to frequency multiplier 13 wherein they are multiplied on a 6:1 basis to develop the periodically recurring pulses of curve D, six pulses being produced in response to each applied pulse. Normally-closed gate circuit 14 which is continuously supplied with a random actuating signal from noise generator 16 is gated open or "turned on" in response to each pulse of curve D to supply periodically recurring bursts of noise energy (curve E) to ring counter 15.

Ring counter 15 is actuated between its multiplicity of operating conditions (seven for the case illustrated) in a predetermined sequence in response to the individual pulse excursions within each of the various bursts of noise energy so that at the termination of each of the bursts of curve E. which collectively define a series of spaced predetermined trigger-time intervals, counting mechanism 15 is established in a randomly selected operating condition. It will be appreciated that in order to actuate the ring counter in such random fashion, the applied signal need only exhibit some random characteristic so that the counter receives a random and different number of actuating pulses during each trigger-time interval. For example, instead of utilizing a noise signal source as shown, a generator producing a pulse signal having a constant pulse repetition frequency may be employed and different numbers of pulses may then be applied to the ring counter during each trigger-time interval. As hereinafter explained, the randomly selected condition of mechanism 15 is "read out" subsequent to the end of each burst of curve E, and storage apparatus 30 is actuated in accordance with this condition of counter 15.

Meanwhile, in order to provide a series of sampling pulses to facilitate the reading-out operation of ring counter 15, the pulses of curve D are supplied to a mono-stable multivibrator 18 to develop the elongated positive pulses shown in curve F. Mono-stable multivibrator 19 operates in response to the trailing edge of each positive pulse of curve F to develop a series of positive ring counter read-out pulses as shown in curve G. These read-out pulses are supplied in parallel to samplers 17—22, which may be considered as normally-closed gate circuits, in order to permit the operating condition of ring counter 15 at the termination of each burst of curve E, e.g., at the termination of each of the series of spaced predetermined trigger-time intervals, to be made known to storage matrix 30.

For convenience, an illustrative series of conditions of ring counter 15 at the end of each time interval may be assumed. Specifically, it may be assumed that at the termination of the third burst of curve E (from the left) or after the third trigger-time interval and also at the termination of the 13th trigger-time interval, the operating stage of ring counter coupled to output circuit 44 assumes a polarity condition opposite to that of all the other six stages in the counter so that negative pulses as shown in curve H are developed at the output terminals of sampler 17 and are applied over input circuit 51 to storage apparatus 30. Similarly, it may be assumed that at the termination of the first, sixth, seventh and tenth spaced trigger-time intervals, ring counter 15 is in such a condition that the polarity of the operating stage coupled to output circuit 45 is different than the polarity of all the other stages so that negative pulses as shown in curve J are produced at the output terminals of sampler 18 and supplied over input circuit 52 to storage matrix 30. In like manner, it may be assumed that the pulses shown in curve K are supplied to storage apparatus 30 over input circuit 53, the pulses of curve L over input circuit 54, the pulses of curve M over input circuit 55, and the pulses of curve N over input circuit 56.

As previously stated, only six of the seven operating stages of ring counter 15 are provided with output circuits; consequently, no pulses are supplied to the storage matrix at the termination of some of the trigger-time intervals. As will be shown, this arrangement facilitates not only a random distribution or sequence of components but also a random appearance of such components within the code signal combination. It may be assumed, for illustrative purposes, that at the termination of the fourth burst of curve E or fourth predetermined trigger-time interval and also after the 14th trigger-time interval, the operating stage of counting mechanism 15 not coupled to an output circuit has a polarity different than all of the other stages so that no output pulse is developed after each of these trigger-time intervals. The pulses illustrated in curves H—N that occur between any two successive field-drive pulses of curve A constitute collectively a first encoding signal developed during a field-trace interval and representing predetermined coding information, as distinguished from a second encoding signal which is developed during a subsequent field-retrace interval and contains the same coding information, as will be explained hereinafter. The pulses of curves H—N are applied to the "ring" input circuits of the memory devices of rows 1–6 respectively (Figures 2 and 5).

Figure 6:
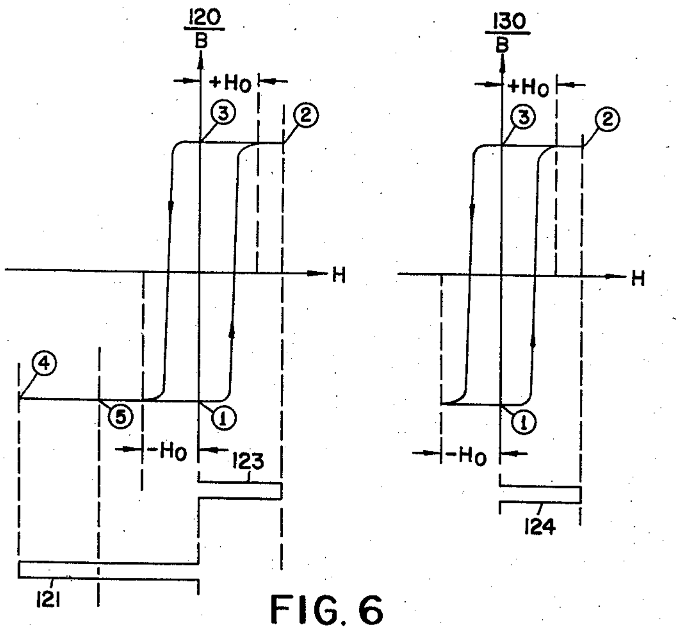

To further explain and in order to appreciate fully the operation of the present invention, attention is directed to the graphical representations shown in Figure 6, wherein 120 represents the hysteresis loop of transformer 90 and 130 the hysteresis loop of transformer 100 of Figure 5, with flux density B plotted as a function of magnetomotive force H. These hysteresis loops characterize the magnetic properties of materials which are ideally suited for utilization in magnetic memory devices such as some of the nickel-iron alloys and certain of the ferrites as is well known in the art, and the corresponding transformers of all memory devices A1–F6 of matrix 30 have corresponding hysteresis characteristics. It will be seen from each curve that a coercive force of $\pm H_0$ is required to drive each magnetic core from complete saturation in one polarity to complete saturation in the opposite polarity, although it should be realized from the illustration that approximately $\frac{2}{3}H_0$ in either direction reaches virtual saturation. If a magnetic core is saturated at point one on either curve, a magnetomotive force less than $+\frac{2}{3}H_0$ will leave the core saturated in that condition. There is no net change in flux density. A magnetomotive force in excess of $+\frac{2}{3}H_0$, as for example that represented by pulse 123, will cause the core to be saturated in the opposite direction as represented by points two and three on loops 120 and 130. In that case, there is a reversal in the direction of the flux within the core.

In a manner to be described hereinafter, each one of the two cores of each memory device is present to an initial flux density condition at a predetermined point (point one) on its hysteresis loop at the beginning of each field-trace interval. The pulses of curves H—N are applied to the "ring" windings with a polarity (illustrated as a negative pulse 121 below loop 120) tending to restrain the flux density condition from changing. As may be observed in loop 120, applying a negative pulse to any of the input windings 93 effects no net change in the flux density condition in view of the unidirectional characteristic of the hysteresis loop as indicated by the arrows. The H point merely travels out to point four and returns to point one, with no appreciable change in B.

In order to store successfully the encoding information as determined by counting mechanism 15, slow timing pulse generator 25 receives the pulses of curve G and develops at each one of its six output circuits selected ones of the pulses of curve G as represented by waveforms P—U respectively. The pulses of curve P—U are applied to the "slow" input circuits 71—76 coupled to the memory devices in columns A—F respectively. Thus, for each cycle of operation of the system, which is shown as occurring during each field trace, each column of memory devices receives one slow timing pulse in a predetermined sequence with respect to the other columns, whereas the various rows are actuated in a random sequence with each row receiving up to six "ring" pulses or none at all.

Although the application of the negative pulses of curves H—N alone over "ring" input circuits 51—56 has no effect, the positive pulses of curves P—U have a very definite effect on the core of transformer 90 and the corresponding transformers of the other memory devices. When a positive pulse of sufficient magnitude is applied to the "slow" input circuit (winding 92) of any of the memory devices, as for example pulse 123 in Figure 6, the flux density condition varies from point one to point two and thence to point three. There is a net change in flux density which gives rise to an induced current in winding 91. Thus, if the effect of all the pulses of curves H—N, only one of which is shown as pulse 121 in Figure 6, is disregarded for the moment, it will be appreciated that in response to the periodic occurrence of the pulses of curves P—U over a cycle of operation the flux density condition of each one of the cores of the input transformers is varied from point one to point three.

Consideration will now be given to the effect of the negative pulses of curves H—N. These pulses are applied with a greater magnitude than the positive pulses of curves P—U, as illustrated by the relatively larger pulse 121 as compared with pulse 123; consequently each time a pulse of curves H—N occurs in time coincidence with one of the pulses of curves P—U, the negative pulse 121 more than balances out the positive pulse 123 so that the flux density of the core effected is prevented from changing from point one to point three on hysteresis loop 120. This is very conveniently shown in connection with loop 120 where it may be seen that when positive pulse 123 from curves P—U occurs in time coincidence with negative pulse 121 from curves H—N, a net negative pulse causes the coercive force (H point) to vary from point one to point five and back to point one again, with no change in flux density.

Thus, as the code signal generator advances through one complete cycle of operation, during the time interval from one field-drive pulse to the next, each column of memory devices is actuated in sequence and the flux density condition of each of the cores of the input transformers is varied, with the exception of those memory devices which in addition to receiving a pulse over one of the "slow" input circuits 71—76 also receives a pulse over one of the "ring" input circuits 51—56. In those cases, the flux density condition remains at point one on the associated hysteresis loop 120. During a cycle of operation, the flux density condition changes in at least thirty of the thirty-six memory devices and remains unchanged in the rest. For example, during the cycle from the first field-drive pulse in curve A to the second, the following memory devices remain unaltered due to the effect of the pulses of curves H—N occurring during that cycle: A6, B1, D4, E2 and F2.

For all the various input transformers that have been actuated, the change in flux density from point one to point three on loop 120 results in the development of a pulse by induction in the associated output winding 91. Each one of the induced pulses is transferred via a diode 95 to the input winding 98 of the associated output transformer 100. Each of these latter pulses is applied with a positive polarity as indicated by pulse 124 below loop 130 in Figure 6 so that the flux density condition varies from point one to point two and then to point three on loop 130. Of course, all of the output transformers of the memory devices actuated by pulses from curves H—N remain in their respective reference conditions (namely, point one). Thus, at the conclusion of one cycle of operation the input and output transformers 90 and 100 of at least thirty memory devices are positioned opposite to their reference points, whereas the input and output transformers 90 and 100 of six memory devices or less are maintained in their reference conditions. It will be remembered that inasmuch as ring counter 15 has seven operating conditions but only six output circuits, there is a possibility that during the occurrence of some of the pulses of curves P—U no pulse occurs in any of curves H—N, resulting in the storage of no information at that time. Thus, during some cycles the transformers 90 and 100 of less than six memory devices remain in their reference conditions. The storage matrix has now stored six "bits" of information, considering the storage of no information whatsoever during the occurrence of one of the pulses of curves P—U as constituting one "bit."

In copending applications such as Serial No. 326,107, filed December 15, 1952, and issued February 11, 1958 as Patent 2,823,252, in the name of Jack E. Bridges; Serial No. 370,174, filed July 24, 1953, in the name of Walter S. Druz; and Serial No. 366,727, filed July 8, 1953, and issued September 16, 1958 as Patent 2,852,598, in the name of Erwin M. Roschke, all of which are assigned to the present assignee, individual combinations of code signal components are preferably utilized during each field-retrace interval. In such systems, it is expedient to read out the stored "bits" of information rather rapidly in order to produce a complete combination of code signal components during a field-retrace interval. To this end, field-drive pulses are supplied to mono-stable multivibrator 29 which produces a series of elongated pulses (curve V) for application to mono-stable multivibrator 28 which operates in response to the trailing edge of each pulse of curve V to develop the pulses shown in curve W. It should be noted that for convenience of illustration the waveforms of the curves of Figure 4 have an expanded time scale as compared to Figure 3, and in order to depict an equal number of field-trace intervals the curves of Figure 4 have been broken at two points. The circuit parameters of multivibrator 29 are so chosen that the trailing edge of each pulse of curve V occurs immediately subsequent to the second series of equalizing pulses superimposed on the vertical blanking pulse, namely during the post-equalizing pulse portion of the vertical blanking interval, otherwise referred to as the "back porch" of the field-blanking pedestal. The circuit parameters of multivibrator 28 are so selected that the duration of each pulse of curve W overlaps or embraces in point of time six line-drive pulses occurring on the vertical "back porch."

The pulses of curve W, which serve as a gating signal, are applied to normally-closed gate circuit 27. Meanwhile, line-drive pulses from synchronizing-signal generator 10 (curve X) are supplied through a delay line 17 to form the pulses shown in curve Y. These latter pulses are supplied to gate circuit 27, but only the delayed line-drive pulses occurring within the intervals of the pulses of curve W are gated in to develop the pulses shown in curve Z at the output terminals. The pulses of curve Z are supplied to fast-timing pulse generator 26 which operates in a similar manner as generator 25 to produce the corresponding pulses of curves AA—FF on respective "fast" input circuits 81—86 of matrix 30.

The pulses of curves AA—FF are applied to the input windings 99 of the output transformers 100 of the memory storage devices in columns A—F respectively. These pulses are of positive polarity as illustrated, and if the cores of the output transformers 100 are established at point one on their respective hysteresis loops 130, the positive pulse will alter that flux density condition from point one to point two and then back to point three. It will be remembered that during the field-trace interval preceding each combination of line-drive pulses shown in curve Z, storage matrix 30 has stored six "bits" of information. Up to six output transformers 100 will be maintained in their reference flux density condition (point one) whereas the flux density in the cores of at least thirty output transformers 100 will already have been changed from point one to point three. Therefore, upon application of the read-out pulses of curves AA—FF, at least thirty of the memory devices will be unresponsive, but the cores of the remaining storage devices will be actuated. Altering the flux density condition from point one to point three on hysteresis loop 130 results in a pulse of current being induced in output winding 97 which is applied through diode 101 to the associated one of output circuits 61—66. Output circuits 61—66 are connected to respective samplers 31—36 to actuate associated code burst generators 37—42 respectively. Sampler circuits 31—36 are provided so that only output pulses corresponding to the read-out pulses of curve Z may be applied to generators 37—42; each time winding 98 receives a pulse when information is read or stored into storage matrix 30 a spurious output pulse may be produced in the associated output winding 97. By employing sampling circuits that are only turned on or gated open in synchronism with the read-out pulses, false operation of the generators in response to such spurious output pulses is precluded.

Considering now specifically the second combination of storage apparatus read-out pulses in curve Z, for example, and referring to the pulses of curves H—N occurring between the first two field-drive pulses of curve A, it will be seen that in response to the first read-out pulse of the second combination in curve Z, which is shown as pulse 127 in curve AA and is applied to all windings 99 of memory storage devices A1—A6, the core of output transformer 100 of memory device A6 will be effected to develop pulse 126 of curve MM on output circuit 66 and also at the output terminals of sampler 36 since that sampler is gated on at that instant by one of the pulses of curve Z; no output pulses are produced by any of the other memory devices of column A since the read-out pulses find them already in the second or opposite flux density condition. In response to the second pulse of the second combination shown in curve Z, which is shown as pulse 128 or curve BB and is applied to all windings 99 of memory devices B1—B6, the core of output transformer 100 of memory device B1 which is conditioned at point one on its hysteresis loop 130 will be changed to point three to produce the output pulse 134 of curve GG on output circuit 61 and also at the output circuit of sampler 31. The third pulse of the second combination of curve Z, which is shown as pulse 129 in curve CC, is applied to memory devices C1—C6 and since each of the cores of the associated output transformers 100 has been actuated from its reference saturation condition to its opposite saturation condition, no pulse is developed on any of output circuits 61—66. In responsive to the fourth pulse of the second combination of curve Z, which is shown as pulse 130 in curve DD, the core of output transformer 100 in memory device D4, which is the only one which has not already been changed from point one to point three on its hysteresis loop, is changed at this time, resulting in the development of the pulse 133 of curve KK on output circuit 64 and also on the output circuit of sampler 34. The fifth pulse of the second combination of curve Z, which is shown as pulse 131 in curve EE, is applied to all windings 99 of memory devices E1—E6, and since the flux density condition of the core of output transformer 100 of memory device E2 has not already been changed from saturation in one direc to saturation in the other, the pulse 135 of curve HH is produced on output circuit 62 and also at the output terminals of sampler 32. Finally, in response to the last pulse of the second combination of curve Z, which is shown as pulse 132 in curve FF, the core of output transformer 100 in memory device F2 is affected to produce the pulse 136 of curve HH on output circuit 62 and also at the output terminals of sampler 32.

Thus, it has been shown that during the read-out process of storage matrix 30, the pulses of curves GG—MM are applied to signal generators 37—42 and during the occurrence of the second combination in curve Z, pulse 126 is initially applied to generator 42 to produce the burst of frequency $f_6$ (curve NN), pulse 134 is applied to generator 37 to produce frequency burst $f_1$, pulse 133 is applied to generator 40 to produce frequency burst $f_4$, and pulses 135 and 136 are applied to generator 38 to produce the two $f_2$ pulses. It should be apparent that each combination of curve NN comprises a plurality of code signal components or code bursts which individually have a predetermined identifying frequency and which collectively determine a code schedule in accordance with their occurrence and distribution within the combination. The code signal components of curve NN are applied to unit 43 which effectively codes the television signal, as for example in the manner shown and described in any of the aforementioned copending applications.

It will be recalled that the pulses illustrated in curves H—N between any two successive field-drive pulses of curve A (for example, between the first two) collectively constitute a first encoding signal developed during a field-trace interval and representing predetermined coding information. It should now be apparent that the pulses of curves GG—MM occurring during the second combination of curve Z (namely, 126, 133—136) collectively constitute a second encoding signal developed during a subsequent field-retrace interval and containing the same predetermined coding information. This second encoding signal is converted into code bursts by means of generators 37—42 and supplied to the coding apparatus in unit 43 to effect actuation thereof in accordance with this predetermined coding information.

As mentioned hereinbefore, it is necessary to preset each of the cores of the various magnetic memory devices by magnetizing them to an initial flux density condition at a predetermined point (point one) on the hysteresis loop at the beginning of each field-trace period. This is achieved by applying field-drive pulses to mono-stable multivibrator 23 which produces in response to each applied pulse the elongated pulses shown in curve QQ, the trailing edge of each pulse occurring immediately succeeding the last pulse in each code signal combination of curve NN. Mono-stable multivibrator 24 is actuated in response to the trailing edge of each pulse of curve QQ to produce the negative pulses of curve RR for application over "reset" input circuit 50 to all windings 93 and 98 of all of the memory devices. These negative pulses magnetize all of the cores to the reference flux density condition (point one) on their respective hysteresis loops. The encoding signal generator is thus conditioned for storage of information during the immediately succeeding field-trace interval and for subsequent reading-out of that information during the succeeding field-retrace interval.

By way of summary, the storage apparatus of the present invention comprises a transformer, such as the transformer 90 in magnetic memory device D3, having a plurality of windings (91, 92 and 93) encompassing a ferromagnetic core which exhibits a predetermined hysteresis loop 120. Monostable multivibrators 23 and 24, conductor 50 and winding 93 constitute presetting means for magnetizing the core of transformer 90 at spaced time intervals to an initial flux density condition at a predetermined point (namely, point one) on hysteresis loop 120. Slow-timing pulse generator 25 constitutes a first source of signal pulses, individually occurring subsequently to one of the spaced time intervals, coupled over conductor 74 and through memory devices D1 and D2 to a winding 92 of transformer 90 of memory device D3 for applying pulses (like 123) thereto with a polarity (positive) tending to alter the flux density condition of the core from the predetermined point one to a second point (namely, point three) on hysteresis loop 120. Ring counter 15, conductor 46, sampler 19 and conductor 53 constitute a second source of signal pulses (namely, the randomly occurring pulses which are to be stored), individually occurring in time coincidence with one of the pulses from the first source, coupled through memory devices A3, B3 and C3 to a winding 93 of transformer 90 of memory device D3 for applying pulses (like 121) thereto with a polarity (negative) tending to restrain the flux density condition from changing to the second point (point three) on hysteresis loop 120. The transformer 100 of memory device D3 and the associated circuitry connected to its windings constitutes a utilizing circuit, and means including a winding of transformer 90 (namely, winding 91 and the coupling circuit to winding 98 of transformer 100) is provided for coupling transformer 90 to the utilizing circuit to condition the circuit in accordance with the particular flux density condition of the core of transformer 90 upon the termination of each pulse from the first source.

The invention provides, therefore, an improved storage apparatus which employs static magnetic memory devices that may be relatively inexpensively constructed.

Certain features described in the present application are disclosed and claimed in copending application Serial No. 463,702, filed October 21, 1954, in the name of Carl G. Eilers and Erwin M. Roschke, and assigned to the present assignee.

While a particular embodiment of the invention has been shown and described, modifications may be made, and it is intended in the appended claims to cover all such modifications as may fall within the true spirit and scope of the invention.

I claim:

1. A storage apparatus comprising: a first transformer including a first ferromagnetic core and a plurality of windings encompassing said first core, said first core exhibiting a predetermined first substantially rectangularly shaped hysteresis loop; first presetting means including a source of reset pulses for magnetizing said first core at spaced time intervals to establish an initial flux density condition at a predetermined point on said first hysteresis loop; a source of timing signal pulses, individually occurring subsequently to one of said spaced time intervals, coupled to a winding of said first transformer for applying pulses thereto with a polarity tending to alter the flux density condition of said first core from the predetermined point to a second point on said first hysteresis loop; a source of read-out signal pulses individually occurring subsequently to respective ones of said timing pulses; a source of storing signal pulses, some of which individually occur in time coincidence with individual ones of said timing pulses, while others individually occur between individual ones of said timing pulses and the immediately succeeding individual read-out pulses, coupled to a winding of said first transformer for applying pulses thereto with a polarity tending to restrain the flux density condition from changing to the second point on said first hysteresis loop; a second transformer including a second ferromagnetic core and a plurality of windings encompassing said second core, said second core exhibiting a predetermined second substantially rectangularly shaped hysteresis loop; second presetting means including said source of reset pulses for magnetizing said second core at said spaced time intervals to an initial flux density condition at a predetermined point on said second hysteresis loop; means including an additional winding of said first transformer and further including unidirectional coupling means for supplying signal pulses of only one polarity to a winding of said second transformer with such one polarity tending to alter the flux density condition of said second core from the predetermined point to a second point on said second hysteresis loop in response to the application to said first transformer of the timing pulses that do not occur in time coincidence with any of said storing pulses; means for applying said read-out pulses to a winding of said second transformer; and means including a winding of said second transformer for sensing the particular flux density condition of said first core subsequent to each of said timing pulses.

2. A static magnetic memory storage apparatus comprising: a first transformer including a first ferromagnetic core and a plurality of windings encompassing said first core, said first core exhibiting a predetermined first substantially rectangularly shaped hysteresis loop; first presetting means including a source of reset pulses for magnetizing said first core at spaced time intervals to an initial flux density condition at a predetermined point on said first hysteresis loop; a source of periodically recurring timing signal pulses, individually occurring subsequently to one of said spaced time intervals, coupled to a first winding of said first transformer for applying pulses thereto with a polarity tending to alter the flux density condition of said first core from the predetermined point to a second point on said first hysteresis loop; a source of periodically recurring read-out signal pulses individually occurring subsequently to respective ones of said timing pulses; a source of randomly occurring storing signal pulses, some of which individually occur in time coincidence with individual ones of said timing pulses while others individually occur between individual ones of said timing pulses and the immediately succeeding individual read-out pulses, coupled to a second winding of said first transformer for applying pulses thereto with a polarity tending to restrain the flux density condition from changing to the second point on said first hysteresis loop; a second transformer including a second ferromagnetic core and a plurality of windings encompassing said second core, said second core exhibiting a predetermined second substantially rectangularly shaped hysteresis loop; second presetting means including said source of reset pulses for magnetizing said second core at said spaced time intervals to an initial flux density condition at a predetermined point on said second hysteresis loop; means including a third winding of said first transformer and further including unidirectional coupling means for supplying signal pulses of only one polarity to a first winding of said second transformer with such one polarity tending to alter the flux density condition of said second core from the predetermined point to a second point on said second hysteresis loop in response to the application to said first transformer of the timing pulses that do not occur in time coincidence with any of said storing pulses; means coupling said read-out signal source to a second winding of said second transformer for applying said read-out pulses thereto with a polarity tending to alter the flux density condition of said second core from the predetermined point to the second point of said second hysteresis loop and effective only subsequent to each of the timing pulses that occurs in time coincidence with one of the storing pulses; and means including a third winding of said second transformer actuated only in response to the application to said second transformer of the read-out pulses that are effective to change the flux density condition of said second core to the second point of said second hysteresis loop thereby to sense the particular flux density condition of said first core as of the termination of each of said timing pulses.

3. A storage apparatus comprising: a first transformer including a first ferromagnetic core and a plurality of windings encompassing said first core, said first core exhibiting a first predetermined and substantially rectangularly shaped hysteresis loop with substantially flat flux density saturation levels at the top and bottom portions of said first loop; first presetting means including a source of reset pulses for magnetizing said first core to saturation at the bottom portion of said first hysteresis loop at spaced time intervals; a source of periodically recurring timing signal pulses, individually occurring subsequently to one of said spaced time intervals, coupled to a first winding of said first transformer for applying pulses thereto with a polarity tending to alter the flux density condition of said first core from the saturation level at the bottom portion of said first hysteresis loop to the saturation level at the top portion of said first hysteresis loop; a source of periodically recurring read-out signal pulses individually occurring subsequently to respective ones of said timing pulses; a source of randomly occurring storing signal pulses, some of which individually occur in time coincidence with individual ones of said timing pulses while others individually occur between individual ones of said timing pulses and the immediately succeeding individual read-out pulses, coupled to a second winding of said first transformer for applying pulses thereto with a polarity tending to restrain the flux density condition from changing to the saturation level at the top portion of said first hysteresis loop, each of said storing pulses having a magnitude sufficient to render ineffective a timing pulse occurring in time coincidence therewith; a second transformer including a second ferromagnetic core and a plurality of windings encompassing said second core, said second core exhibiting a second predetermined and substantially rectangularly shaped hysteresis loop with substantially flat flux density saturation levels at the top and bottom portions of said second loop; second presetting means including said source of reset pulses for magnetizing said second core to saturation at the bottom portion of said second hysteresis loop at said spaced time intervals; means including a third winding of said first transformer and further including unidirectional coupling means for supplying signal pulses of only one polarity to a first winding of said second transformer with such one polarity tending to alter the flux density condition of said second core from the saturation level at the bottom portion of said second hysteresis loop to the saturation level at the top portion of said second hysteresis loop in response to the application to said first transformer of the timing pulses that do not occur in time coincidence with any of said storing pulses; means coupling said read-out signal source to a second winding of said second transformer for applying said read-out pulses thereto with a polarity tending to alter the flux density condition of said second core from the saturation level at the bottom portion of said second hysteresis loop to the saturation level at the top portion of said second hysteresis loop and effective only subsequent to each of the timing pulses that occurs in time coincidence with a storing pulse; and means including a third winding of said second transformer actuated only in response to the application to said second transformer of the read-out pulses that are effective to saturate said second core to the saturation level at the top portion of said second hysteresis loop thereby to sense the particular flux density condition of said first core as of the termination of each of said timing pulses.

References Cited in the file of this patent

UNITED STATES PATENTS

| | | |
|---|---|---|
| 2,673,337 | Avery | Mar. 23, 1954 |
| 2,695,993 | Haynes | Nov. 30, 1954 |
| 2,709,798 | Steagall | May 31, 1955 |
| 2,710,957 | Steagall | June 14, 1955 |

OTHER REFERENCES

"Magnetic Binaries in the Logical Design," by Saunders in Proc. of Assoc. For Computing Machinery. May 1952 (pp. 226–228).

"Thesis on Magnetic Cores," by Haynes, May 26, 1952.

"The Use of Magnetic Cores As Switching Devices," a thesis by Minnick, Sept. 16, 1953, Harvard University Library (pp. 2–1 through 2–30).